US012735304B2

(12) United States Patent
Etemadi et al.

(10) Patent No.: US 12,735,304 B2
(45) Date of Patent: Sep. 15, 2026

(54) MOVEABLE WINCH CONTROL SYSTEM

(71) Applicant: BPG-ARROWHEAD WINCH INC., Broken Arrow, OK (US)

(72) Inventors: Christopher Shahram Etemadi, Tulsa, OK (US); David Mitchell Anthony, Broken Arrow, OK (US); Donald Christopher Carl, Bixby, OK (US); Eric David Predeek, Saint Augustine, FL (US)

(73) Assignee: BPG-ARROWHEAD WINCH INC., Broken Arrow, OK (US)

( * ) Notice: Subject to any disclaimer, the term of this patent is extended or adjusted under 35 U.S.C. 154(b) by 171 days.

(21) Appl. No.: 18/908,226

(22) Filed: Oct. 7, 2024

(65) Prior Publication Data

US 2026/0097937 A1 Apr. 9, 2026

(51) Int. Cl.
*B66D 1/40* (2006.01)
*B66D 1/60* (2006.01)

(52) U.S. Cl.
CPC ................. *B66D 1/40* (2013.01); *B66D 1/60* (2013.01); *B66D 2700/0133* (2013.01)

(58) Field of Classification Search
CPC .................................... B66D 1/40; B66D 1/00
See application file for complete search history.

(56) References Cited

U.S. PATENT DOCUMENTS

2019/0382248 A1* 12/2019 Norstad .................. B66D 1/00

* cited by examiner

*Primary Examiner* — Benyam Haile
(74) *Attorney, Agent, or Firm* — Seed Intellectual Property Law Group LLP

(57) ABSTRACT

A winch control system for off-road mobile construction or forestry equipment that includes a designated cab or operator platform area for operating the off-road mobile construction or forestry equipment is disclosed herein, the winch control system may include an input device. The input device may include a control interface and may be configured to control one or more functions of a winch in response to user interaction with the control interface. The input device may be portable and may be configured to be moved about the designated cab or operator platform area. The winch control system may be configured to enable operation of the winch when the input device is positioned within the designated cab or operator platform area and such that the input device is unable to control the one or more functions of the winch from a location beyond the designated cab or operator platform area.

20 Claims, 6 Drawing Sheets

MOVEABLE WINCH CONTROL SYSTEM

BACKGROUND

Technical Field

The present disclosure relates generally to a winch control system, specifically winch controls systems for winches coupled to a machine or a vehicle.

Description of the Related Art

Winches may be mounted on a variety of vehicles and other machines, including bulldozers, log skidders, or similar off-road mobile construction or forestry machines. Typically, the controls of winches mounted on such vehicles or other machines include either fixed internal controls or distant remote controls.

With fixed internal controls, winch controls and winch operational status indicators are fixed to a particular location within the machine cab or operator platform. Such fixed-location winch controls within the machine cab or operator platform may be uncomfortable or cumbersome for the operator to use or may not enable the operator to visually monitor from the normal operator position while also visually monitoring the load and/or may be uncomfortable or difficult or even impossible to operate from other positions that the operator may need or desire to assume to maintain continuous observation of the winch and/or a load of the winch through all potential winch operating angles.

With distant remote controls, fully remote winch controls and indicators may be located entirely outside of the machine on which the winch is mounted. These remote operating locations may be a separate protected operator station outside the machine that the winch is mounted on but inside a winch operating safety risk area, or a location entirely outside a winch operating safety risk area. A winch operating safety risk area may be defined as approximately the area that can be reached by the winch cable at full extension and may include further allowances for the size of a typical load and/or additional safety allowance(s). A distance remote control location entirely outside the winch operating safety risk area may be a great distance away from the machine and the winch. Such fully remote winch control systems are often expensive and it may be impractical or inconvenient for an operator to complete all tasks that may be related to winching operations from a distance remote control location. Winching related tasks that may be inconvenient or impractical to complete from a distance remote control location include, but are not limited to, connecting and disconnecting individual winch loads.

In some industries, winch control systems may include local remote controls. FIG. 1 shows an example schematic diagram of a local remote control system associated with a machine 50. The machine 50 includes a machine cab or operator platform 52. FIG. 1 also shows a winch operating safety risk area 54 of the machine 50. Such local remote controls may be a movable control and indicator module enabling the operator to control some or all winch operating functions and/or to observe operating indications of a winch. A working area 56 of a local remote control is shown in FIG. 1. The working area 56 includes all space within the machine cab or operator platform 52 and also includes space outside of the machine cab or operator platform but within a winch operating safety risk area 56. Such movable but minimally restricted winch control arrangements are not utilized in bulldozer, log skidder, or similar off-road mobile construction or forestry applications due to the much greater operator safety risks associated with such applications compared to light-to-medium recovery applications and due to industry standard safety practices and/or governmental safety regulations.

BRIEF SUMMARY

Embodiments described herein include moveable winch control systems that are configured to provide improved comfort and productivity to the operator of the winch without degrading safety of the operator. The winch control systems are configured to control winches attached to off-road mobile construction or forestry equipment that includes a designated cab or an operator platform area for operating the off-road mobile construction or forestry equipment.

The moveable winch control system includes an input device including a control interface, which is configured to control one or more functions of the winch in response to user interaction with the control interface. The input device is portable and configured to be moved about the designated cab or operator platform area of the off-road mobile construction or forestry equipment. The winch control system is configured to enable operation of the winch when the input device is positioned within the designated cab or operator platform area, but is also configured such that the input device is unable to control the one or more functions of the winch from a location beyond the designated cab or operator platform area.

In some embodiments, the input device may include a monitor interface configured to display one or more operating status details of the winch. The input device may be separate from one or more control devices configured to operate one or more non-winch functions of the off-road mobile construction or forestry equipment. However, the input device may be configured to additionally control one or more non-winch functions of the off-road mobile construction or forestry equipment. The input device may be a hand-held unit.

In some embodiments, the input device may be tethered within the designated cab or operator platform area of the off-road mobile construction or forestry equipment. The input device may be electrically coupled to the winch by a wired connection. In some instances, the input device may include mechanical, hydraulic, and/or pneumatic controls, such as mechanical, hydraulic, or pneumatic actuators, hydraulic or pneumatic conduits, and/or hydraulic or pneumatic valves, and may be mechanically, hydraulically, or pneumatically coupled to the winch in addition to or instead of an electrical coupling. A tether coupling the input device to the interior of the designated cab or operator platform area may be configured to prevent the input device from extending and/or being operated beyond the interior of the designated cab or operator platform area.

In some embodiments, the input device may be wirelessly coupled to a control unit of the winch and may be configured to wirelessly communicate with the control unit of the winch. In some embodiments, an input device transceiver may be used to communicate with the input device. The control unit of the winch may be configured to detect or determine a distance from the input device to an input device transceiver of the control unit, and/or a position of the input device relative to the control unit and/or the designated cab or operator platform area. When the distance detected by the control unit is greater than a threshold distance, the winch control system is configured to cease operation of the winch. The control unit may be configured to define a geofence and may compare the position of the input device relative to the geofence. When the control unit detects the input device is on a side of the geofence outside of the designated cab or operator platform area, the winch control device system is configured to cease operation of the winch. The designated cab or operator platform area may be configured as a faraday cage configured to prevent communication between the input device and the input device transceiver when the input device is located exterior to the faraday cage. Such a prevention of communication between the input device and the input device transceiver renders the input device unable to control the one or more functions of the winch.

In some embodiments, a supplemental input device may be provided to control one or more functions of the winch. The supplemental input device may be configured to control one or more functions of the winch that are different than the one or more functions of the winch controlled by the user interface of the input device. The winch control system may be configured to enable control of one or more specific limited winch functions by the supplemental input device when the supplemental input device is positioned beyond the designated cab or operator platform area.

Among other benefits, aspects of the embodiments disclosed herein may provide a benefit to operators of a winch by enabling the operator to face the winch and/or winch load while operating the same, due to the moveable nature of the input device within the designated cab or operator platform area.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and techniques associated with winch control systems may not be shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
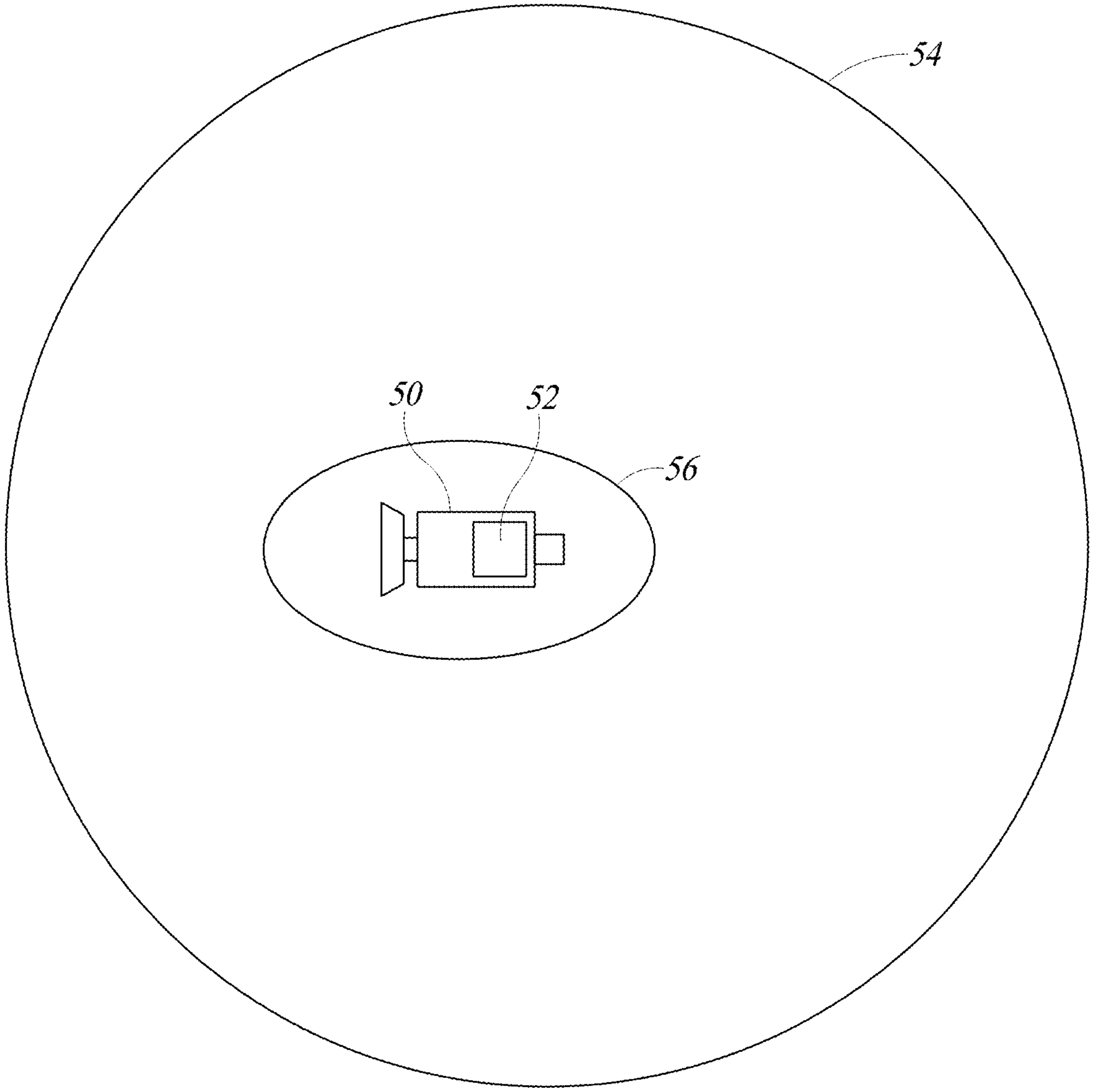
FIG. 1 (PRIOR ART)
FIG. 1 shows a schematic top view of an operating area of a local remote control of a winch according to the prior art.
Figure 2:
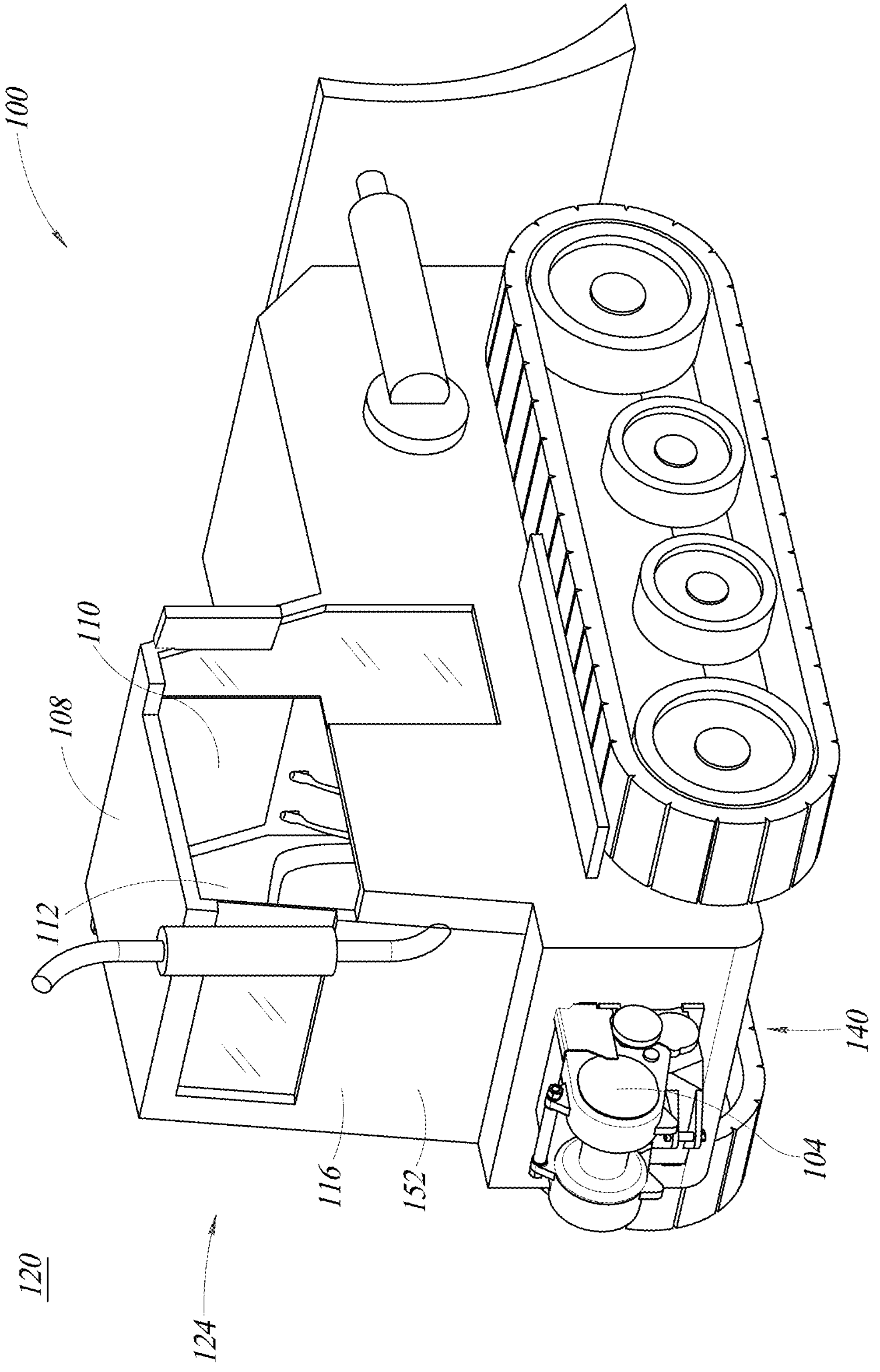
FIG. 2 shows a perspective view of an off-road mobile construction machine, having a sectioned portion, with a winch mounted thereon.

FIG. 2 shows a machine 100, specifically an off-road mobile construction machine, which in this example is a bulldozer, including a winch 104 thereon. Although a bulldozer is shown as the machine 100, any other suitable off-road mobile construction machine, forestry equipment machine, or the like, may be utilized as the machine 100 in the embodiments described herein.

As can be seen in FIG. 2, the machine 100 includes an exemplary embodiment of a designated cab or operator platform area 108 (hereinafter, "the cab"). It should be understood that the cab 108 includes any space configured for safe placement of the operator during operation of the machine 100 and/or attachments to the machine 100. The cab may be configured to be fully enclosed, partially enclosed, or largely open, and may or may not include various forms of safety guarding. All cab configurations are intended to fall within the scope of this disclosure. As can be seen, a portion of the cab is sectioned such that FIG. 2 allows an interior 110 of the cab 108 to be seen in FIG. 2. The cab 108 is configured such that an operator of the machine 100 may operate the machine 100 while positioned within the interior 110 of the cab 108. The cab 108 may be configured to provide a designated safe zone 112 for the operator therein. The designated safe zone 112 may be coextensive with the interior 110 of the cab 108. A control system having machine controls for operating the machine 100 (e.g., track controls, dozer blade controls) may be positioned within the cab 108. In some embodiments, the winch 104 may be positioned aft of the cab 108, such that the operator faces away from the winch 104 when operating the machine 100. The winch 104 is controlled by a winch control system 124.

Figure 3A:
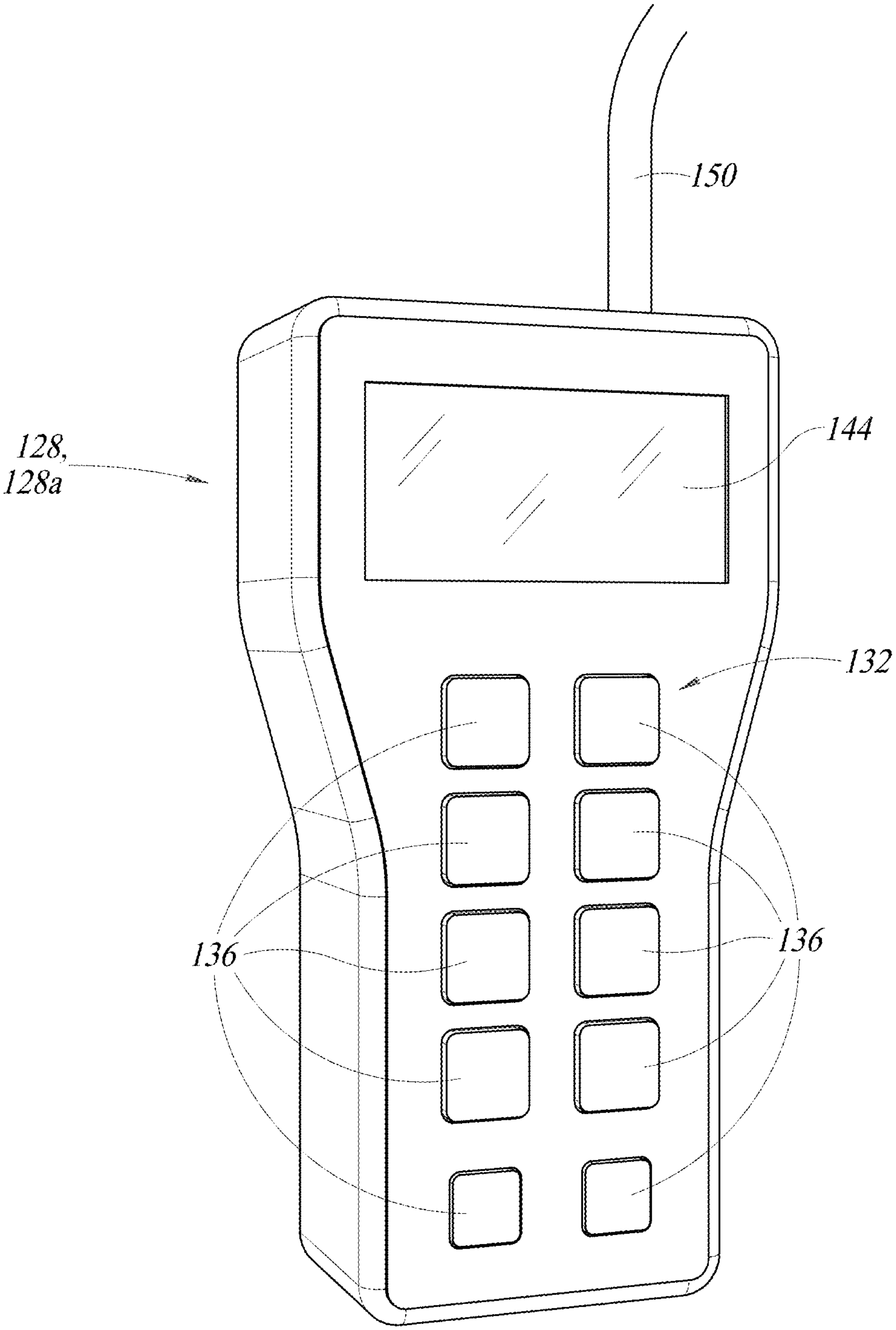
FIG. 3A shows a front view an exemplary input device for controlling one or more functions of a winch.
Figure 3B:
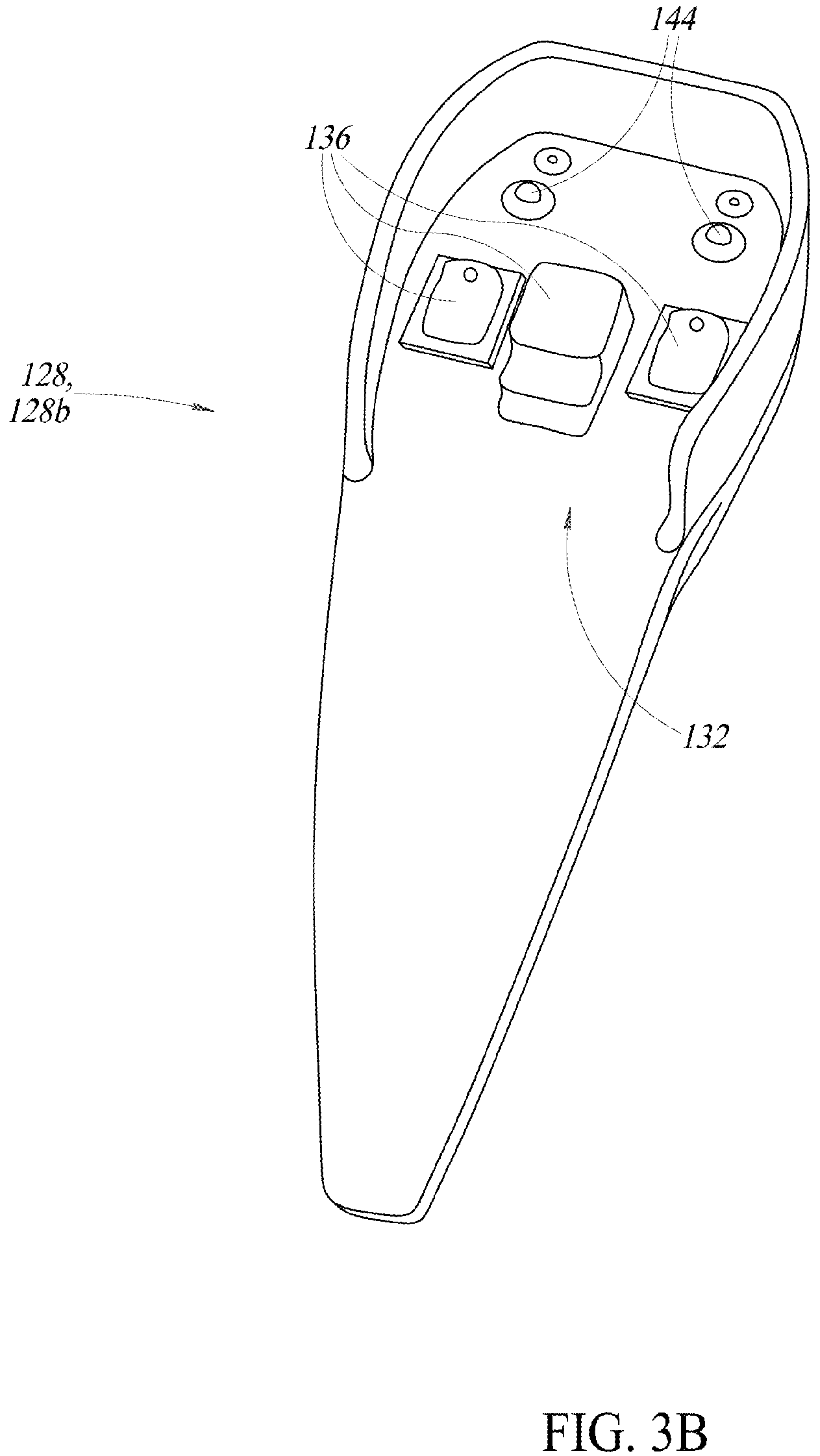
FIG. 3B shows a front view of another exemplary input device for controlling one or more functions of a winch.
Figure 3C:
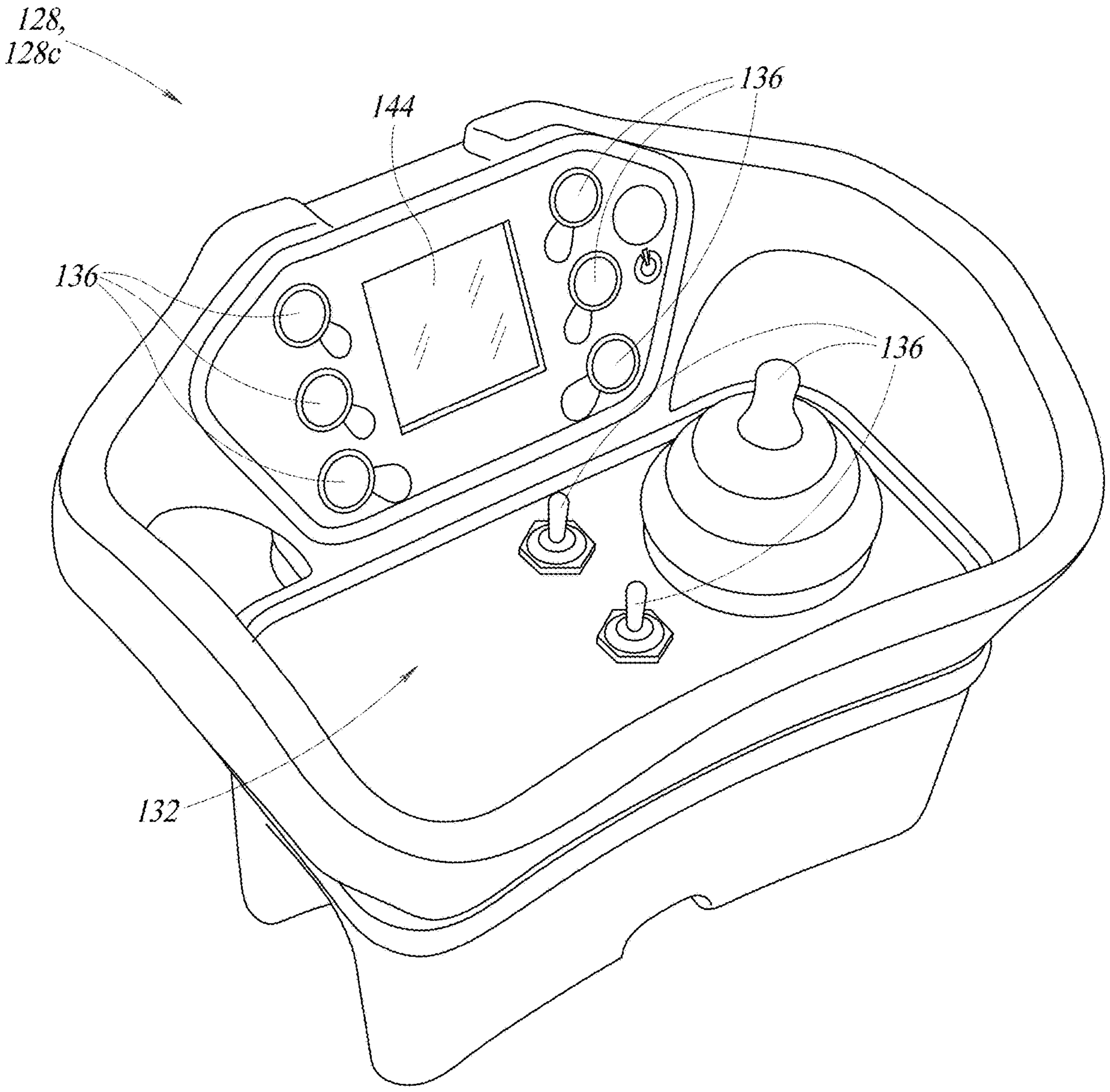
FIG. 3C shows a front view of another exemplary input device for controlling one or more functions of a winch.

The winch control system 124 includes one or more input devices 128, three examples of which (respectively shown as 128*a*, 128*b*, and 128*c*) are shown in FIGS. 3A, 3B, and 3C. It should be understood that the input device is not limited to the embodiments shown in FIG. 3A, 3B, or 3C, and may be configured in any way in accordance with this disclosure. The input device 128 includes a control interface 132. The control interface 132 may comprise one or more input interfaces 136, which may be buttons, switches, or any other suitable input interface (e.g., touch pad). The input device 128 is configured to control one or more functions of the winch 104 in response to user interaction with one or more input interfaces 136 of the control interface 132. The one or more winch control functions could include but would not be limited to, power-in, power-out, driveaway/brake-off, freespool, freefall, winch speed range, variable load limiting, variable drum drag, and variable flushing. The input device 128 is portable. Specifically, the input device 128 is configured to be moved about the cab 108. The input device 128 may be a hand-held unit. The portable input device 128 enables an operator to move about the cab 108 as necessary in order to watch operation of the winch 104. For example, when the winch 104 is positioned on the machine 100 aft of the cab 108, an operator may be required to stand and turn toward a rear 140 of the machine 100 in order to supervise operation of the winch 104. Such a movement by the operator may be uncomfortable or place the operator in an uncomfortable position if the input device 128 is not configured to be portable.

In some embodiments, the input device 128 may include a monitor interface 144 thereon. The monitor interface 144 may be configured to display one or more operating status of the winch 104, which may include but may not be limited to:

cable load, drum torque, cable speed, drum speed, reel-in control status, reel-out control status, driveaway/brake-off control status, freespool control status, freefall control status, winch temperature and/or any other suitable operating status of the winch 104.

In some embodiments, the input device 128 may be separate from the control device of the machine that is configured to operate the machine 100. In some embodiments, the input device 128 may be configured to additionally control one or more machine functions unrelated to the winch 104. In some embodiments, the input device 128 may be partially or fully integrated with existing machine control and status indicator functions and may be integrated through proprietary technologies or through industry standard technologies, such as SAE J1939 or similar North American or International standards.

Control of the winch 104 by the input device 128 may be electric, pneumatic, mechanical, hydraulic, or any combination thereof. In some embodiments, the input device 128 may be tethered to the interior 110 of the cab 108 of the machine 100, such as in the embodiment shown in FIG. 3A. When the input device 128 is tethered to the interior 110 of the cab 108, the input device 128 may be electrically coupled to a control unit of the winch 104 by a wired connection. The wired connection may be enabled by wires extending through a tether 150 connecting the input device 128 and the control unit of the winch 104. In some embodiments in which the input device 128 is tethered to the interior 110 of the cab 108, the input device 128 may include mechanical, hydraulic, and/or pneumatic controls, such as mechanical, hydraulic, and/or pneumatic actuators, and/or hydraulic or pneumatic valves, and may be mechanically, hydraulically, and/or pneumatically coupled to the winch 104. In some embodiments, the mechanical, hydraulic, and/or pneumatic controls of the input device may be coupled in any combination to the winch 104 via the control unit of the winch 104. For instance, the tether 150 may include mechanical connections, and/or hydraulic or pneumatic conduits that connect the input device 128 to the control unit of the winch 104. In some embodiments, the mechanical, hydraulic, and/or pneumatic controls of the input device may be coupled directly to the winch 104.

In some embodiments, the input device 128 may be wirelessly coupled to a control unit of the winch 104. In such embodiments, the input device 128 is configured to wirelessly communicate with the control unit of the winch 104. The control unit of the winch 104 may include an input device transceiver to wireless communicate with the input device 128. The input device transceiver may be located within the cab 108, but may not necessarily be within the cab 108. Such communications may occur via radio, Wi-Fi, Bluetooth, or any other suitable communication method. In some embodiments, the control unit of the winch 104 may be configured to detect a distance from the input device 128 to the input device transceiver and/or a position of the input device 128 relative to the input device transceiver.

The winch control system 124 may be configured to enable operation of the winch 104 when the input device 128 is positioned within the cab. On the other hand, the winch control system 124 may be configured such that the input device 128 is unable to control the one or more functions of the winch 104 from a location beyond the cab. In other words, operation of the winch 104 by the input device 128 may cease or be prevented if the input device 128 is positioned outside of the cab 108.

Figure 4:
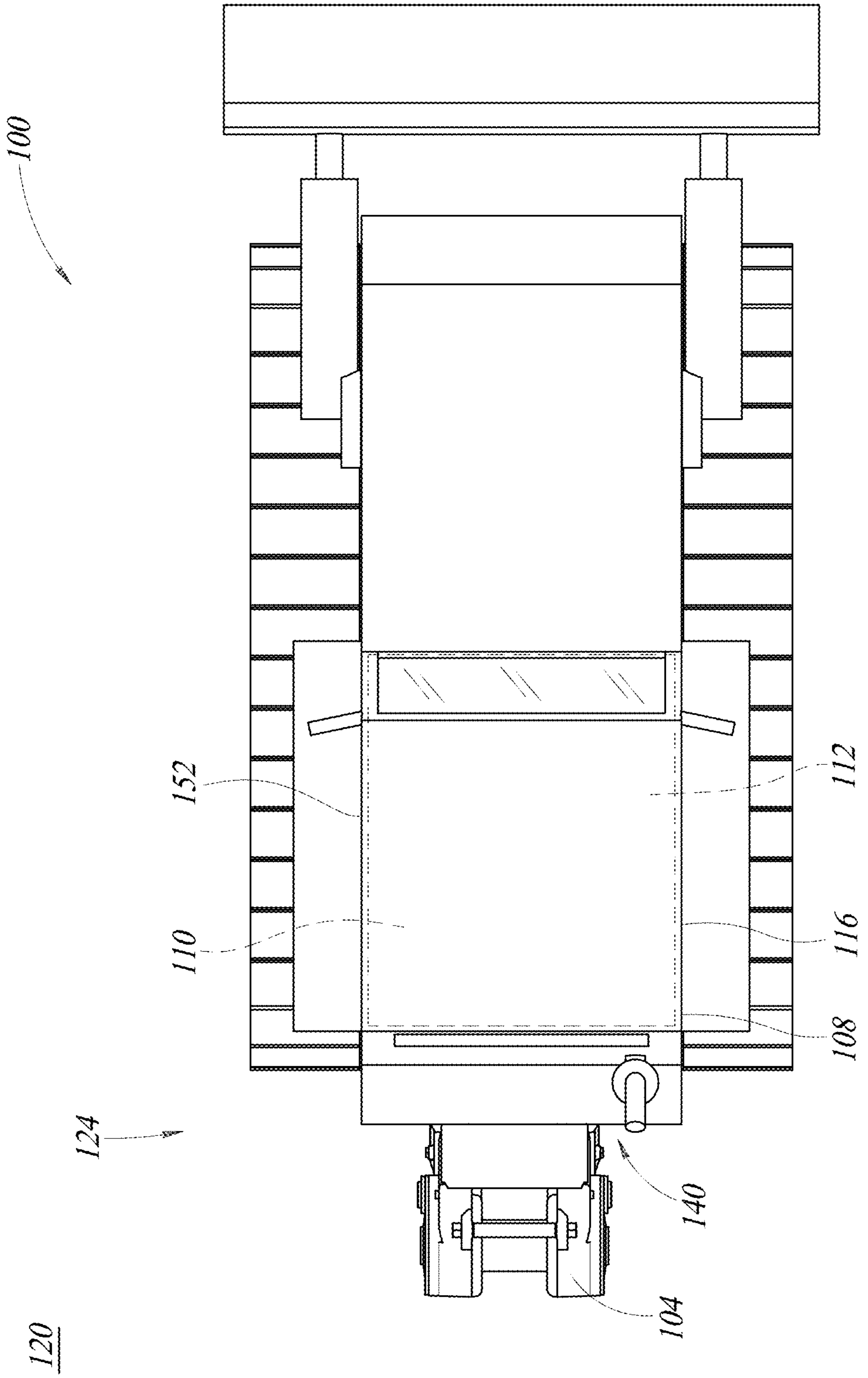
FIG. 4 shows a schematic top view of an operational range of the input device relative to the machine on which the winch is mounted.

A boundary 152 of the cab 108 is shown in FIG. 4 and represents a limit to where the input device 128 may be operable to control the winch 104. Various embodiments utilizing the boundary 152 are described in further detail below.

In embodiments in which the input device 128 is tethered to the interior of the cab 108, the tether 150 may physically prevent operation of the winch 104 by the input device 128 from a location beyond the boundary 152 due to the configuration of the tether 150. The tether 150 may be configured to only extend to locations within the cab 108.

In embodiments in which the control unit of the winch 104 is configured to detect the distance from the input device 128 to the input device transceiver of the control unit of the winch 104, the winch control system 124 may be configured to cease operation of the winch 104 if the distance from the input device 128 to the input device transceiver exceeds a threshold distance. The threshold distance may be the maximum distance the input device 128 may be from the input device transceiver while remaining in the cab 108.

In some embodiments, the control unit of the winch 104 may be configured to define a geofence. Further, the control unit of the winch 104 may be configured to detect a position of the input device 128 relative to the geofence. The geofence may be configured to generally be coextensive with the cab 108. The boundary 152 represents the geofence in such embodiments. For example, the geofence may be configured to align with the physical barrier 116 (e.g., walls of the cab) surrounding the cab 108 and/or the geofence may be configured to bridge elements of the cab 108 where there are no physical barrier(s) 116 such as with open or partially enclosed cab areas. Thus, the geofence acts to provide a threshold defining whether the input device 128 is within or beyond the cab 108. When the control unit of the winch 104 detects the input device 128 is on a side of the geofence which is exterior to the cab 108 in exterior space 120, the winch control system 124 is configured to cease operation of the winch 104.

In some embodiments, the cab 108 may be configured to include a faraday cage configured to prevent communication crossing the faraday cage. For example, the faraday cage may prevent communication between the input device 128 and the input device transceiver when the input device 128 is located exterior to the faraday cage and the input device transceiver is positioned within the faraday cage. The physical barrier 116 surrounding the cab 108 may be configured to act as the faraday cage, and thus, the physical barrier 116 acts as the boundary 152 in such embodiments. In such embodiments, the physical barrier 116 may prevent communications between objects within the cab 108, such as the input device transceiver, and objects beyond the cab 108, which may include the input device 128 if moved exterior to the cab 108. When the faraday cage prevents communication between the input device 128 and the input device transceiver positioned in the interior of the cab 108, the input device 128 is unable to control the one or more functions of the winch 104.

In some embodiments, the winch control system 124 may further include a supplemental input device. The supplemental input device may be an input device according to the description of the input device 128 described above, except as described below. The supplemental input device may or may not include a monitor interface similar to that which may be included with the input device 128. The supplemental input device may be configured to control one or more functions of the winch 104 that are normally and/or by necessity employed when the operator is outside the machine cab or operator platform and/or are deemed by appropriate authority to be safe for operation when the operator is outside the machine cab or operator platform. Winch functions that may be in this category (hereinafter referred to as "safety functions") include (but might not be limited to): "freespool" (or equivalent function) and brake-on/neutral. Winch functions that typically would not be in this category may include (but might not be limited to); power-in, power-out, driveaway (or equivalent function), etc. The specific limited functions controlled by the supplemental input device may be different than the one or more functions of the winch 104 controlled by the user interface of the input device 128. Additionally or alternatively, the supplemental input device may be configured to control one or more supplemental functions of the winch 104 which overlap with functions of the input device 128. The supplemental input device may be physically separate from the input device 128, such that the input device 128 and the supplemental input device need not be physically coupled to each other. In some embodiments, such as when the input device 128 and the supplemental input device include at least one similar functionality, the supplemental input device may override the input device 128.

In some embodiments which include the input device 128 and the supplement input device, the winch control system 124 may be configured to enable operation of the winch 104 when both the input device 128 and the supplemental input device are positioned within the cab 108 (i.e., within the boundary 152). When the supplement input device is located beyond the cab 108 (i.e., beyond the boundary 152), then the winch control system 124 may be configured such that the supplemental input device is able to control the functions of the winch 104 controllable by the supplemental input device. Alternatively, the winch control system 124 may be configured to only enable the supplemental input device to control the winch 104 when the supplemental input device is positioned outside of the cab 108.

In some embodiments which include only the input device 128 without a supplemental input device, the winch control system 124 may be configured to allow control of certain functions when the input device 128 is outside of the cab area. In such embodiments, remaining controls associated with input device 128 may be subject to the same restrictions as described above in the description of the input device 128.

The winch control system described herein may be adapted to a variety of different pieces of equipment or machinery. Such a winch control system may provide improved safety to an operator of a winch by requiring the operator to be positioned in a designated cab or operator platform area when operating the winch. Such a winch control system may provide enhanced safety for the operator of the winch by allowing the operator to face the winch while holding the input device.

Certain advantages may be realized when (1) a mobile off-road construction and/or forestry machine is equipped with a cab or operator platform, (2) a winch is attached to the machine, (3) a winch control interface is included that can be moved within the cab, and (4) the movable winch control interface cannot control safety critical winch functions when positioned outside the cab.

The devices and systems of the disclosure each have several innovative aspects, no single one of which is solely responsible or required for the desirable attributes disclosed herein. The various features described above may be used independently of one another, or may be combined in various ways. All possible combinations and subcombinations are intended to fall within the scope of this disclosure. Various modifications to the implementations described in this disclosure may be readily apparent to those of ordinary skill in the art, and the generic principles defined herein may be applied to other implementations. Thus, the claims are not intended to be limited to the implementations shown herein, but are to be accorded the widest scope consistent with this disclosure, the principles and the novel features disclosed herein.

Certain features that may be described in this specification in the context of separate implementations also may be implemented in combination in a single implementation. Conversely, various features that may be described in the context of a single implementation also may be implemented in multiple implementations separately or in any suitable subcombination. Moreover, although features may be described above as acting in certain combinations and even initially claimed as such, one or more features from a claimed combination can be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A winch control system for off-road mobile construction or forestry equipment that includes a designated cab or operator platform area for operating the off-road mobile construction or forestry equipment, the winch control system comprising:

an input device including a control interface, the input device configured to control one or more functions of a winch in response to user interaction with the control interface thereof, wherein the input device is portable and configured to be moved about the designated cab or operator platform area of the off-road mobile construction or forestry equipment, wherein the winch control system is configured to enable operation of the winch when the input device is positioned within the designated cab or operator platform area, and wherein the winch control system is configured such that the input device is unable to control the one or more functions of the winch from a location beyond the designated cab or operator platform area.

2. The winch control system of claim 1, further comprising a monitor interface on the input device configured to display an operating status of the winch.

3. The winch control system of claim 1, wherein the input device is separate from a control device configured to operate one or more non-winch functions of the off-road mobile construction or forestry equipment.

4. The winch control system of claim 1, wherein the input device is tethered to an interior of the designated cab or operator platform area of the off-road mobile construction or forestry equipment.

5. The winch control system of claim 1, wherein the input device is electrically coupled to the winch by a wired connection.

6. The winch control system of claim 1, wherein the input device is wirelessly coupled to a control unit of the winch and is configured to wirelessly communicate with the control unit of the winch.

7. The winch control system of claim 6, wherein a control unit of the winch is configured to detect a distance from the input device to an input device transceiver, wherein the input device transceiver is configured to wirelessly communicate with the input device, wherein the input device transceiver is positioned in an interior of the designated cab or operator platform area of the off-road mobile construction or forestry equipment, and wherein when the distance detected by the control unit is greater than a threshold distance, the winch control system is configured to cease operation of the winch.

8. The winch control system of claim 6, wherein a control unit of the winch is configured to define a geofence and to detect a position of the input device relative to the geofence, the geofence having an operational side and a shutoff side, and wherein when the control unit detects the input device is on the shutoff side of the geofence, the winch control system is configured to cease operation of the winch.

9. The winch control system of claim 6, wherein the designated cab or operator platform area is configured as a faraday cage, the faraday cage configured to prevent communication between the input device and an input device transceiver when the input device is located exterior to the faraday cage, and wherein when the faraday cage prevents communication between the input device and an input device transceiver positioned in an interior of the designated cab or operator platform area, the input device is unable to control the one or more functions of the winch.

10. The winch control system of claim 1, wherein the input device is mechanically, hydraulically, and/or pneumatically coupled to the winch.

11. The winch control system of claim 1, wherein the input device is a hand-held unit.

12. The winch control system of claim 1, wherein the winch is positioned on the off-road mobile construction or forestry equipment aft of the designated cab or operator platform area.

13. The winch control system of claim 1, wherein the input device is configured to additionally control one or more non-winch functions of the off-road mobile construction or forestry equipment.

14. The winch control system of claim 1, further comprising a supplemental input device having a control interface, the supplemental input device configured to control one or more safety functions of the winch, wherein the supplemental input device is portable and configured to be moved about both inside and outside of the designated cab or operator platform area of the off-road mobile construction or forestry equipment.

15. The winch control system of claim 14, wherein the supplemental input device is configured to control the one or more safety functions of the winch both inside and outside of the designated cab or operator platform area of the off-road mobile construction or forestry equipment.

16. The winch control system of claim 14, wherein the supplemental input device further includes a monitor interface.

17. The winch control system of claim 1, wherein the input device is configured to operate one or more safety functions of the winch from a location beyond the designated cab or operator platform area.

18. A winch system, comprising:

a winch unit including a control unit; and an input device including a control interface, the input device communicatively coupled to the control unit of the winch unit, wherein the input device is portable and configured to be moved about within a designated safe zone, wherein the input device is configured to provide operation instructions to the control unit of the winch unit when the input device is positioned within the designated safe zone, and wherein the winch system is configured such that the input device is unable to provide operation instructions to the winch unit when the input device is located beyond the designated safe zone.

19. The winch system of claim 18, wherein the input device is a hand-held unit.

20. The winch system of claim 18, further comprising a monitor interface on the input device configured to display an operating status of the winch system.

* * * * *